J. H. GLAUBER.
COUPLING OR LOCK NUT.
APPLICATION FILED APR. 9, 1910.

1,092,256.

Patented Apr. 7, 1914.
2 SHEETS—SHEET 1.

ATTEST
E. M. Fisher
F. P. Mussun

INVENTOR
JOSEPH H. GLAUBER
BY Fisher & Moser
ATTYS.

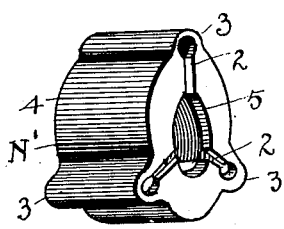
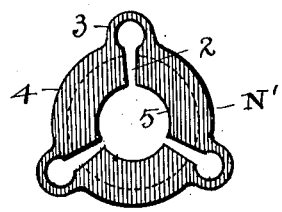
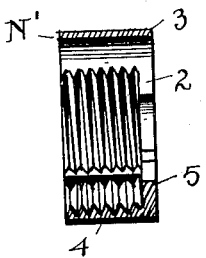
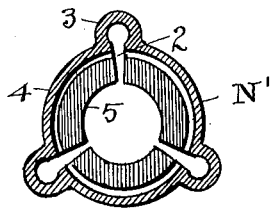
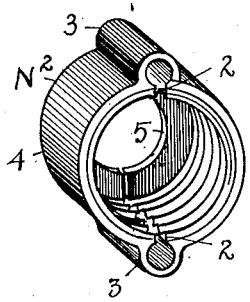
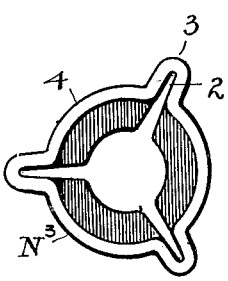

UNITED STATES PATENT OFFICE.

JOSEPH H. GLAUBER, OF CLEVELAND, OHIO.

COUPLING OR LOCK-NUT.

1,092,256.

Specification of Letters Patent. Patented Apr. 7, 1914.

Application filed April 9, 1910. Serial No. 554,551.

*To all whom it may concern:*

Be it known that I, JOSEPH H. GLAUBER, citizen of the United States, residing at Cleveland, in the county of Cuyahoga and State of Ohio, have invented certain new and useful Improvements in Couplings or Lock-Nuts, of which the following is a specification.

My invention relates to an improvement in couplings or lock nuts, and the invention consists in a nut which is both expansible and contractible as well as being otherwise adaptable according to the place and conditions of use, all substantially as shown and described and particularly pointed out in the claims.

Figure 1:
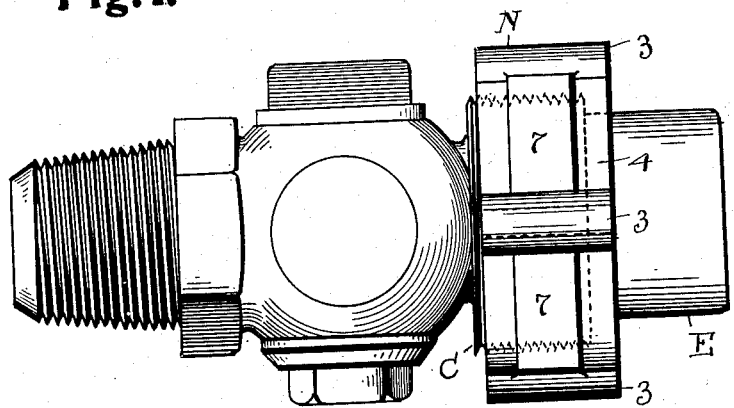
Figure 2:
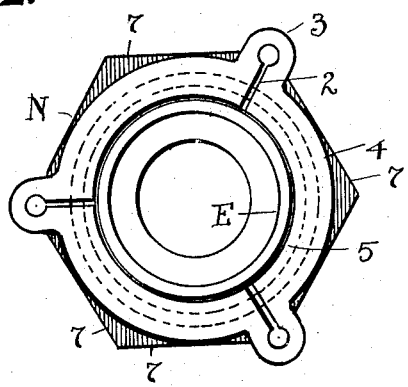
Figure 3:
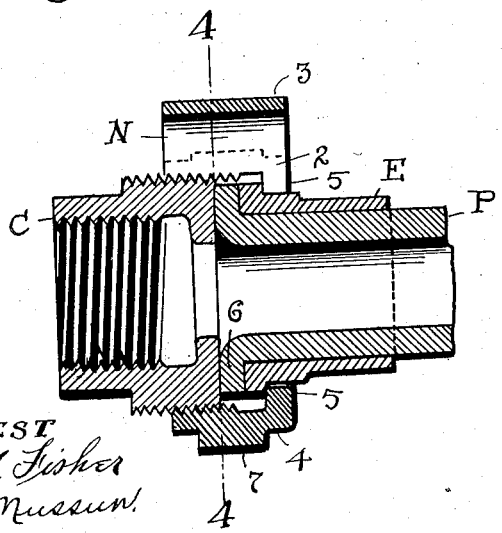
Figure 4:
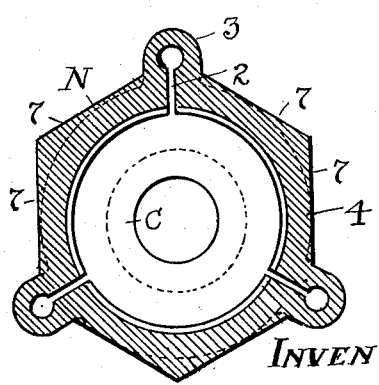

In the accompanying drawings, Figure 1 is a side elevation of a cock and coupling in which my improved nut is employed, and Fig. 2 is an end elevation of Fig. 1 looking in from the right. Fig. 3 is a longitudinal sectional elevation of a lead flange coupling and my improved nut. Fig. 4 is a sectional view on line 4—4, Fig. 3. Figs. 5 to 9 are views of modifications of the nut, one form thereof being shown in Figs. 5, 6, 7 and 8 and still another form in Fig. 9, all as hereinafter fully described. Fig. 10 is a sectional view of my improved nut made of drawn metal.

The nut as thus shown in all the several views has one or more features common to all and which consists in the slits or slots 2 and the wings or loops 3 in which said slits or slots terminate, and the said wings or loops themselves are distinguished by being formed upon the outside of the otherwise circular or round or other surface of the nut indicated by 4 in the several views. A further common feature of all the forms of nut shown is the flange 5 on what may be considered as the face side of the nut and which practically makes a cap nut construction adapted to be used in couplings with lead pipes P, as in Fig. 3, and which have their ends flanged or flared as at 6 and adapted to form a packing to avoid possible leakage as well as serving to lock the pipe in place. Or the pipe P might be made of any other material than lead and have a collar corresponding to flange 6, the essential thing in any fitting for fluids being to seal the joint at this place by the flange 6, or its equivalent, to prevent leakage through the nut N. This is material because the nut being split across its threads would probably leak in this kind of a fitting if it were not safeguarded in a suitable manner substantially as shown. It is therefore necessary to provide a gasket or sealing medium in some such relation as flange 6 sustains to the coupling member C on one side and the thimble or sleeve E on the other to make a perfect fluid tight union. The same conditions obtain as to the form of nut N' in Figs. 5 to 8 and as to nut N² Fig. 9, in which but two loops 3 and corresponding slits are shown. One or more may be used in any form of the nut, and obviously this nut is not limited to tubular connections but may be employed with bolts, rods or other solid parts.

In addition to the foregoing the nut N is shown as having hexagonal formation centrally about its body indicated by straight flat sides 7 in Figs. 2 and 4 and lying in pairs between the three several loops 3. This disposition of said sides in pairs between said loops has the important advantage of bringing the said sides or faces 7 directly opposite each other in parallel planes and with the entire surface exposed to apply a wrench. However, the flat sides 7 may be omitted, and the nut formed as seen in Figs. 5 to 10, wherein loops 3 project sufficiently beyond the circular portion of the nut to provide for wrench or plier engagement.

The wall of the loops 3 in a cast nut may be heavier or lighter relative to the thickness of the wall of the nut than herein shown, and flange 5 may be wider or narrower according to the relation and construction of parts with which it is to be used. Loops 3 connect the split sections and provide an endless and unbroken outer wall which gives substantially all the strength of a solid nut, and flange 5 at right angles thereto additionally strengthens the nut and prevents buckling of its sections.

Now, having the nut constructed substantially as hereinbefore set forth, the advantage and use thereof becomes apparent. It is particularly of value in cases of emergency or when sent out promiscuously to be attached to a connecting member, the precise dimensions of which and the form or style of thread are unknown. In such case if the threaded portion with which the nut is to connect be too large for the nut as it comes to the job the nut can be expanded to the required size, or if the threaded portion be relatively smaller then the nut can be compressed or contracted to conform thereto.

This is done by simply compressing the loops or wings 3 together, using a hammer, vise or other suitable tool, and in the other case the nut is expanded or spread to enlarge the same to the required size. I have referred to the nut as being expansible and contractible and these capabilities are made manifest in the adaptations just described. The said nut is therefore yielding or elastic as to working size or might even be referred to as adjustable or convertible to different sizes, and herein lies the essence of the invention, the peculiar and original construction of the nut being taken into consideration as compared with other nuts heretofore made and which lay claim to yielding characteristics within limits.

Another peculiarity of my nut above described lies in its adaptation to different threads. In the manufacture of union couplings it is customary to make the coupling parts with straight running threads, so that a swiveling coupling nut can be screwed up any desired distance to effect coupling connection between its members by compressing or otherwise closing tightly upon a gasket or other intervening seat. The said straight or mechanical thread is employed only for drawing together the two parts of the coupling connection. The ordinary threaded parts with straight threads could not be used for making any coupling connections, which depend upon a tapering thread to form a hydraulic or sealing joint.

Now, my nut as above described may have straight running threads and be connected with parts having tapered threads as it is capable of expanding sufficiently to screw upon such threads any desired distance the same as when straight threads are used for both parts, thus making it adaptable to the regular standard connections with tapered threads found in the commercial art. The angular sides of V-shaped threads assist in spreading the nut, but a square thread also may be used when less expansion is needed, as in a union connection made between two hard seats, or where but a very slight yield is provided for the seating engagements, when it often is desirable that the coupling parts be screwed together loosely until a firm impression is made between the seating parts and with the least resistance upon the threaded mechanical engagement. After the members have been firmly clamped together and having my improved nut, the wings or loops 3 may be compressed and the nut thus be rigidly bound in the meshes of the threads. This frequently is very desirable as it prevents the loosening of the engaged parts due to any vibration, shock or the like. This nut also meets the disadvantages that arise from corrosion of threaded engagements, and which have heretofore been avoided by making one part iron and the other brass. But by my construction I can use all iron or any other metal and by merely inserting an instrument in the openings 3 sufficiently expand the nut to effect release. This can also be done without injury to the threads on the pipe because the said wings or openings have sufficient depth to permit an instrument to do the work without coming in contact with the threads.

The so-called slits or slots 2 may have the initial characteristics of slots or slotted openings rather than mere slits which are closed, as the first demand upon the nut may be to contract it upon a materially smaller part. Or it may require expansion considerably beyond the original width of the slot as it comes from the factory.

The portions 3 are defined as loops, preferably, but in another sense consist of projections on the outside of the nut across the same from side to side and bored through their base to provide a yielding outer wall and connected by open slots with the interior of the nut, thus dividing the nut into sections according to the number of such slots and each section adapted to be carried inward and outward more or less according as the position thereof is controlled through expansion or contraction of the said yielding projections 3.

In a hexagonal nut, the preferred way is to form the loops at the meeting angle of every alternate pair of faces 7 as shown in Figs. 1 to 4.

A nut $N^3$ constructed of drawn metal is shown in Fig. 10, and the only difference in construction as compared with the other forms of nut shown, is in the walls thereof which are of the same thickness throughout, including the loops. The advantage of a drawn metal nut constructed according to my invention and as compared with a cast nut is as follows, first, the threads will stand a greater strain and be less liable to strip, secondly, the sections and loops possess greater spring properties, thirdly, the nut as a whole is practically unbreakable within greater limits, and fourthly, less operations are required to produce a finished nut and a corresponding reduction in cost is thereby effected.

Ordinarily it is difficult to make a drawn screw nut and provide a good wrench surface thereon, but in my construction the wings or loops provide prominent and easily engaged gripping portions which may be conveniently and readily formed in drawn metal, and this I believe to be new and of great utility in the art.

What I claim is:

1. A coupling nut having integral enlargements at intervals about its outside with openings through the same from side to side of the nut and slots from said openings into the nut, and provided with flat surfaces parallel to each other oppositely between said enlargements and adapted to engage a wrench therewith.

2. A nut having an inwardly-extending annular flange at one side provided with radial slots and outward projections radially in line with said slots at intervals from side to side provided with circular holes, the walls about said holes being of uniform depth and adapted to be expanded or contracted and thereby change the working size of the nut.

3. A nut of angular formation having spring loops formed integral therewith at the meeting angle of every alternate pair of its wrench-engaging faces.

4. A coupling nut comprising a seamless wall threaded internally and having integral loops of uniform depth longitudinally thereof, and having independent segmental portions projected inwardly at right angles from said wall between said loops to provide a coupling flange adapting uniform expansion of said nut when coupling connections are being made.

In testimony whereof I affix my signature in presence of two witnesses.

JOSEPH H. GLAUBER.

Witnesses:
E. M. FISHER,
F. C. MUSSUN.